United States Patent [19]
Sala

[11] 4,112,976
[45] Sep. 12, 1978

[54] IMPROVEMENTS IN OR RELATING TO CONTROLS FOR HYDRAULIC VALVES

[75] Inventor: Angelo Sala, Latina, Italy

[73] Assignee: Massey-Ferguson Services N.V., Curacao, Netherlands Antilles

[21] Appl. No.: 761,143

[22] Filed: Jan. 21, 1977

[30] Foreign Application Priority Data

Jan. 22, 1976 [GB] United Kingdom ............... 02443/76

[51] Int. Cl.² .............................................. G05G 9/04
[52] U.S. Cl. .............................. 137/636.2; 74/471 XY
[58] Field of Search ................. 74/471 XY; 137/636.2

[56] References Cited
U.S. PATENT DOCUMENTS

| | | | |
|---|---|---|---|
| 3,768,328 | 10/1973 | Campbell | 74/471 XY |
| 3,943,791 | 3/1976 | Casey | 74/471 XY |

*Primary Examiner*—Gerald A. Michalsky
*Attorney, Agent, or Firm*—Thomas P. Lewandowski

[57] ABSTRACT

A control arrangement for a pair of valves in which a control member is pivoted on the control lever of a first valve for movement normal to movement of first control lever. A link interconnects control member and U-shaped control lever of second valve so that movement of control member about pivot causes movement of second valve.

12 Claims, 3 Drawing Figures

CONTROLS FOR HYDRAULIC VALVES

This invention relates to controls for hydraulic valves.

It has become common practice to operate a plurality of hydraulic valves by a single control lever.

The most common type of such control includes a pivot joint which allows universal movement about its axis. However, such arrangements usually require a support structure and so are only used to operate valves remote from the operator's station.

A further type of arrangement which allows operation of valves located at the operator's station is shown in U.K. Pat. No. 971822. However, this arrangement does not permit the use of a cranked lever which is usually desirable, due to the twisting force generated which tends to lock the control lever.

It is an object of the present invention to provide a control in which the above disadvantages are obviated or mitigated.

According to the present invention there is provided a control assembly for a pair of hydraulic valves each having a spool slidable along their respective longitudinal axis, said control comprising a first control lever connected to a first of said spools and pivoted for movement about an axis perpendicular to the longitudinal axis of said first valve a second lever connected to a second of said valves and pivoted for movement about an axis perpendicular to the longitudinal axis of said second valve, a control member pivotally connected to said first control lever for movement about an axis normal to the pivot axis of said first control lever and link means interconnecting said control member and said second control lever to transmit movement of said control member relative to said first control lever to said second control lever.

Preferably said link means includes a joint having a pivot axis coincident with the pivot axis of said first control lever.

Preferably also the said longitudinal axes of said valves are parallel.

An embodiment of the invention will now be described by way of example only with reference to the accompanying drawings in which.

Figure 1:
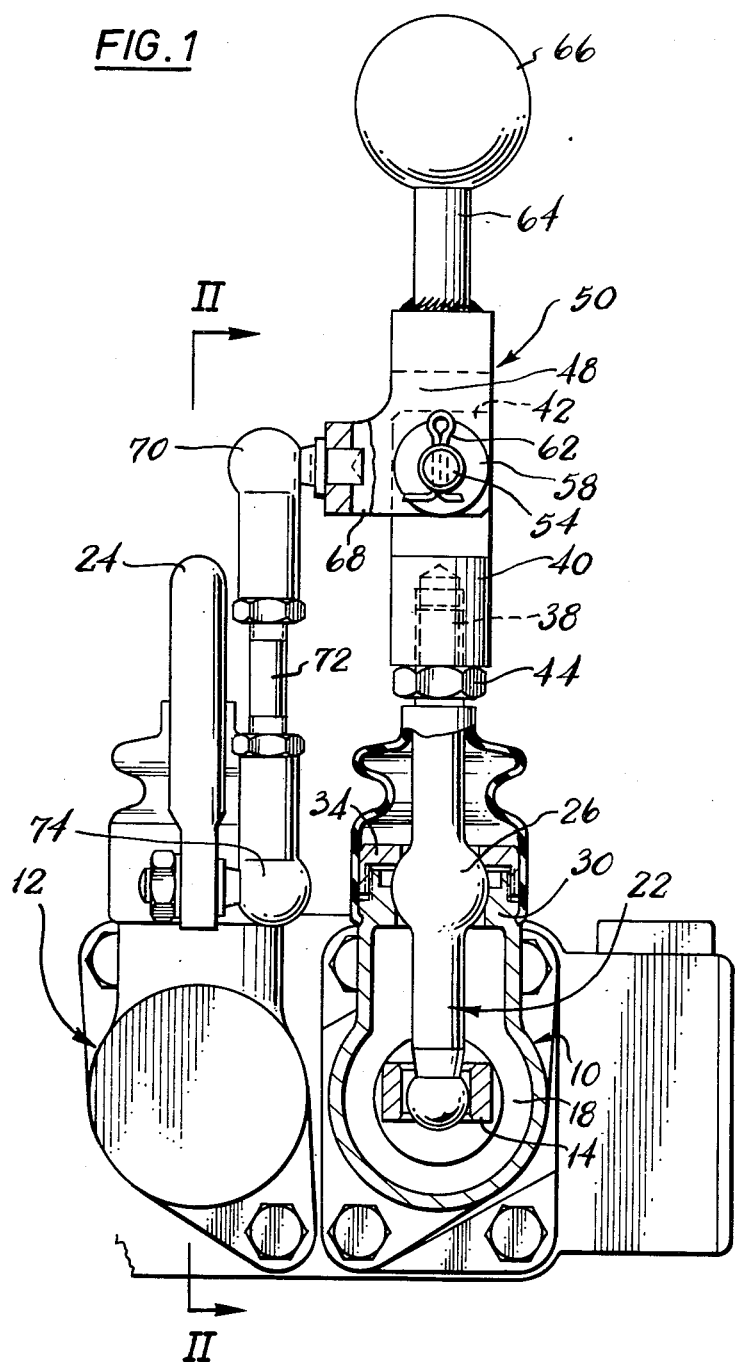
FIG. 1 is a front elevation partly sectioned of a pair of control valves and the associated control assembly.
Figure 2:
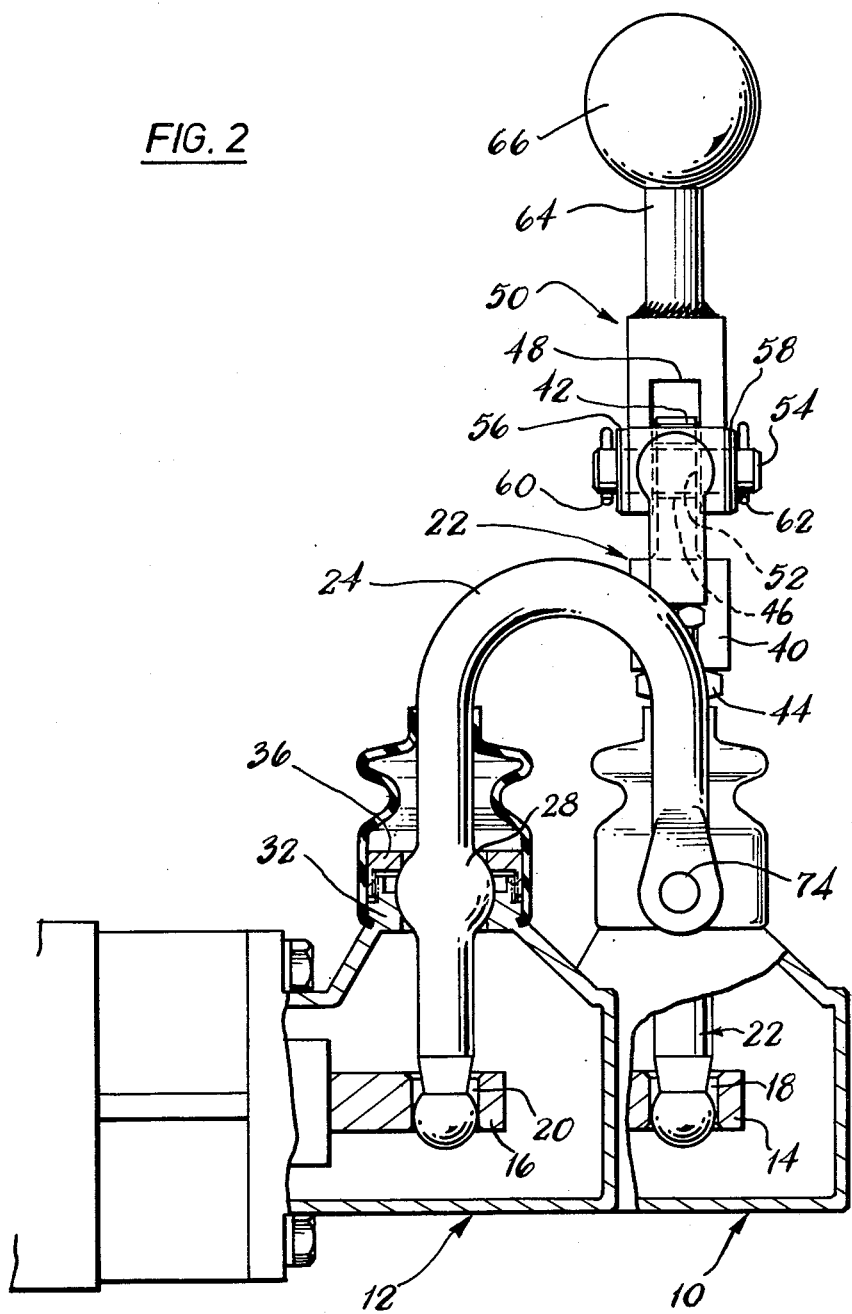
FIG. 2 is a view on the line II — II in FIG. 1.

Referring now to the drawings, a pair of hydraulic valves 10, 12 have a spool 14, 16 respectively, slidable along a longitudinal axis. The extremity of each spool has a recess 18, 20 in which engages one end of a control lever 22, 24. Each of the control levers 22, 24 has a spherical portion 26, 28 which are respectively received in a part spherical housing 30, 32 on the valve 10, 12 and secured by caps 34, 36 threaded to the housing 30, 32.

The control lever 24 is bent through 180° in the form of a U. The control lever 22 has a threaded end 38 on which is mounted a block 40 having a flange 42. The block 40 is secured against rotation by a locknut 44. The flange 42 has a through bore 46 and is received within a bifurcated portion 48 of a control member 50. The bifurcated portion 48 has a through bore 52 and is secured to the flange 42 by a pin 54 passing through the bores 46, 52. The pin 54 is located by washers 56, 58 and split pins 60, 62.

The control members 50 includes the bifurcated portion 48, a rod 64 welded to the bifurcated portion 48 and a knob 66 secured to the rod 64.

The bifurcated portion 48 has an extension 68 to which is secured a spherical joint 70 threadingly connected to one end of a link 72. The other end of the link 72 is connected to a spherical joint 74 which is secured to the end of the second control lever 24.

It will be noted that the axis of joint 74 is coincident with the axis about which the control lever 22 must move to cause movement of the spool 14.

The operation of the device is as follows.

Figure 3:
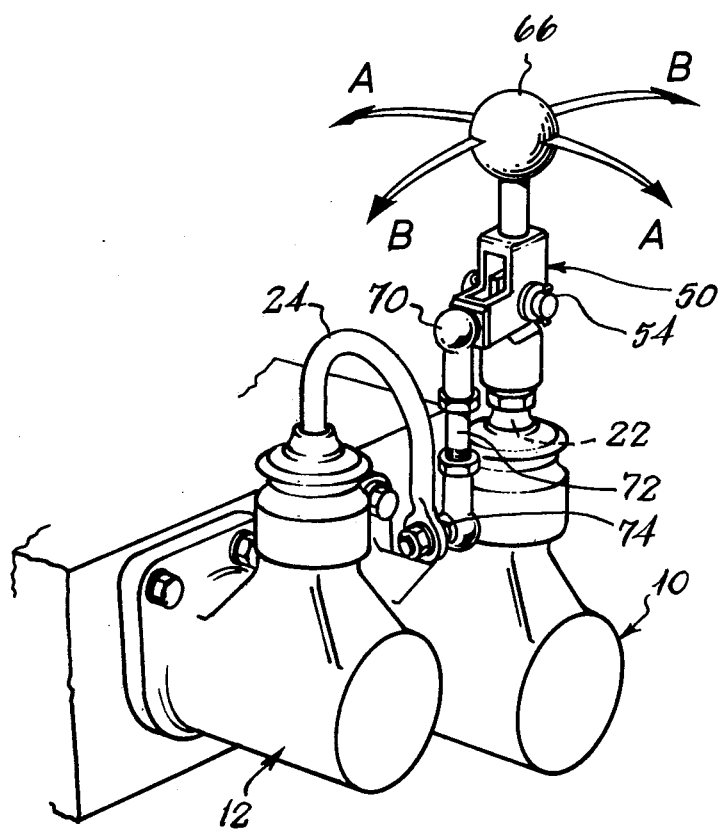
FIG. 3 is a perspective view of the control assembly.

Movement by the operator of the control knobs 66 in the plane denoted by AA in FIG. 3 is transmitted through the pin 54 to the control lever 22. This causes pivotal movement of the lever 22 about the spherical portion 26 and moves the spool 14 along its longitudinal axis. The translation of the bifurcated portion 48 is transmitted to the link 72 which rotates about the joint 74. Because of the location of the axis of the joint 74 no movement is transmitted to the control lever 24 so that the valve 12 is unaffected.

Movement of the control member 50 in the plane BB cause the bifurcated portion 48 to pivot on the pin 54 and move the link 72 along its longitudinal axis. This movement is transmitted to the control lever 24 which pivots about its spherical portion 28 and moves the spool 16 along its longitudinal axis.

Thus each valve may be moved independently of the other by appropriate manipulation of the knob 66 or alternatively both valves may be moved conjointly. By using the control levers 22, 24 to support the control assembly 50 a compact and simple control arrangement is achieved.

What I claim is:

1. A control assembly for a pair of valves each having spools slidable along their respective longitudinal axes, said control assembly comprising a first lever, a first end on said first lever pivotally connected to a first of the valve spools and said first lever pivoted for movement about an axis perpendicular to and offset from the longitudinal axis of said first spool, a second lever, a first end on said second lever pivotally connected to a second of the valve spools and said second lever pivoted for movement abut an axis perpendicular to and offset from the longitudinal axis of said second valve spool, a control member, a second end on said first lever, said control member pivotally connected to said second end of said first lever about an axis perpendicular to the offset axis of said first lever, said first lever first end pivotal connection to said first valve spool, said offset axis and said pivotal connection of said control member to said first lever being aligned to define a straight line, a second end on said second lever, and link means interconnecting said control member and said second end of said second lever to transmit pivotal movement of said control member about said second end of said first lever to said second lever to move the second valve spool while movement of said control member and said first lever about said offset axis of said first lever moves the first valve spool.

2. A control assembly according to claim 1 wherein said link means includes a joint having a pivot axis coincident with the pivot axis of said first control lever.

3. A control assembly according to claim 1 wherein the longitudinal axes of said valves are parallel.

4. A control assembly according to claim 3 wherein the pivot axes of said first and second control levers are spaced apart in the direction of the longitudinal axes of said valves.

5. A control assembly according to claim 1 wherein said link means is U-shaped.

6. A control assembly according to claim 1 wherein said first control lever terminates in a flange and said control member terminates in a bifurcated portion, said flange and bifurcated portion being pivotally connected by a pin.

7. A control assembly according to claim 6 wherein the longitudinal axis of said pin is parallel to the longitudinal axis of said first valve.

8. A control assembly according to claim 1 wherein the pivot axes of said first and second levers are intermediate the ends thereof.

9. A control assembly according to claim 1 wherein said first lever has a straight longitudinal axis on which lie said first end pivotal connection to said first valve spool, said offset axis and said pivotal connection of said control member to said first lever being aligned to define a straight line.

10. A control assembly including a control lever movable to affect operation of two actuators either individually or simultaneously for moving two components either individually or simultaneously, said control assembly comprising:
a first elongate member having first and second ends mounted for pivotal movement about a first axis comprising a universal joint between said ends, said first member operatively connected by said first end to one of said actuators,
a second member to which said control lever is connected, said control lever mounted on said first member second end for pivotable movement about a second axis, and
means operatively connecting said second member and the other of said actuators mounted for pivotal movement about a third axis spaced from said first and second axes and generally parallel to said first axis, said operative connecting means operating an actuator only when said second member is pivoted about its axis and said first lever operating an actuator only when pivoted about its axis in response to movement of said control lever.

11. A single lever control for first and second control valves each having spools reciprocal within a housing for the valves, comprising:
an elongate first arm and opposing first and second ends on said first arm first end pivoted on the first valve spool;
a universal joint on said first arm between said first and second ends thereon pivotally supporting said first arm on the valve housing;
a handle pivotally mounted on said first arm second end for pivoting said first arm about said universal joint to stroke the first valve spool;
a second arm and first and second ends on said second arm, said second arm first end pivoted on the second valve spool;
a second universal joint on said second arm between said second arm first and second ends pivotally supporting said second arm, said first and second universal joints pivoting said first and second arms about parallel axes when said arms actuate the valve spools, said axes being spaced apart longitudinally of the valve housings; and
means operatively connecting said second arm and said handle for actuation of the second valve spool only when said handle is pivoted relative to said first arm and said first arm actuating the first valve spool only when said handle pivots said first arm.

12. The lever control according to claim 11 wherein said second arm is U-shaped.

* * * * *